Patented July 12, 1932

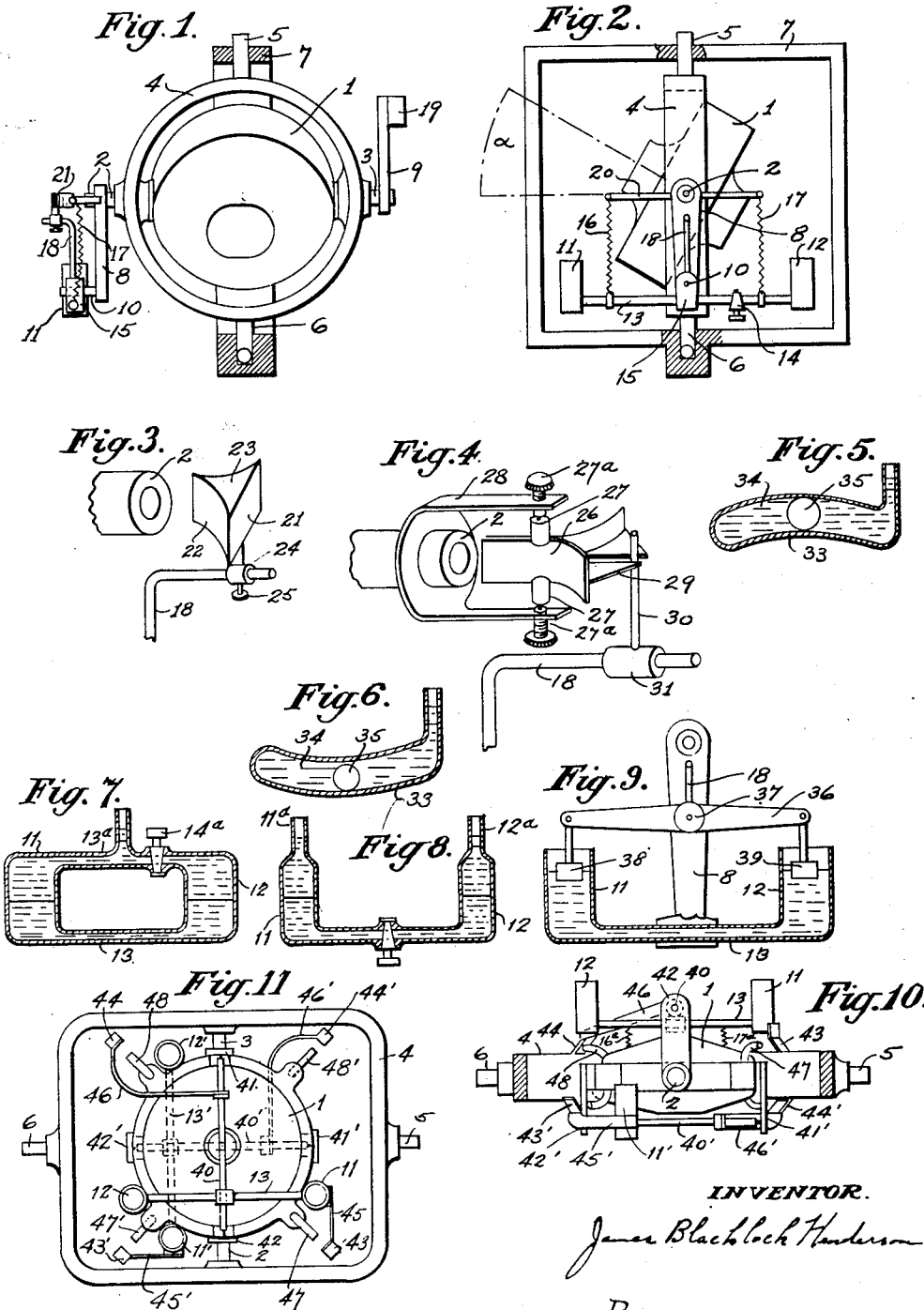
July 12, 1932.  J. B. HENDERSON  1,866,706
GYROSCOPIC INSTRUMENT AND APPARATUS
Filed July 26, 1919    3 Sheets-Sheet 1

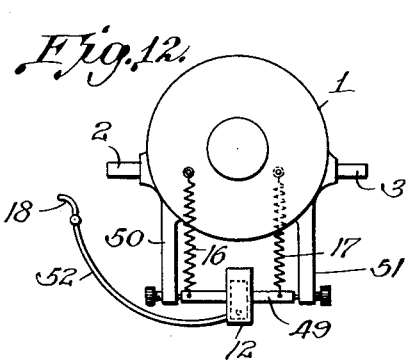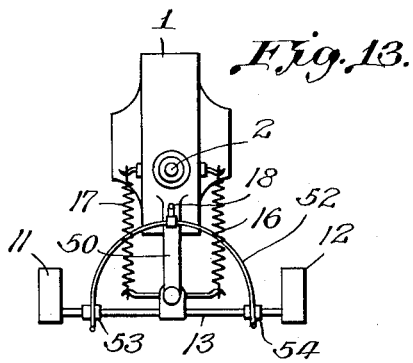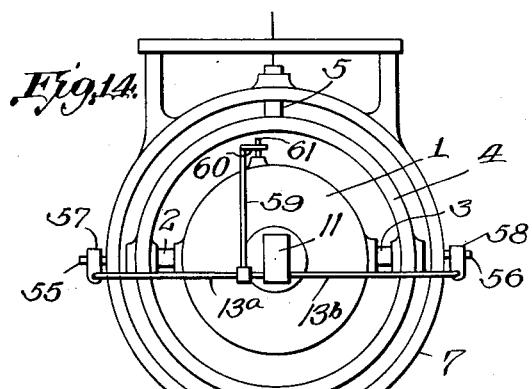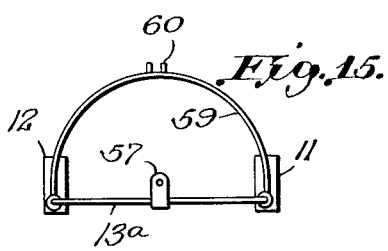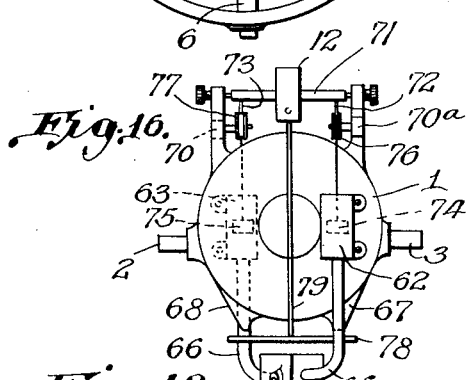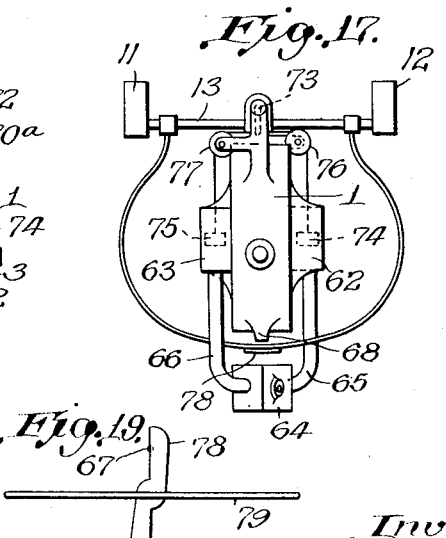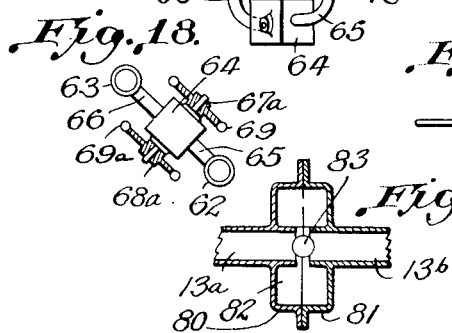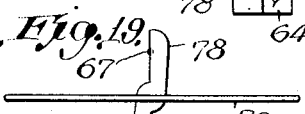

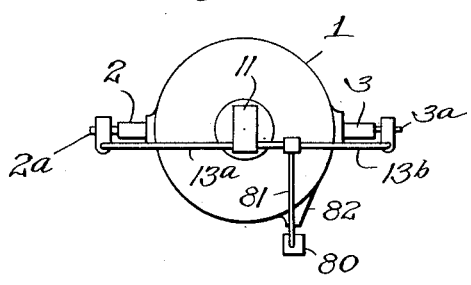
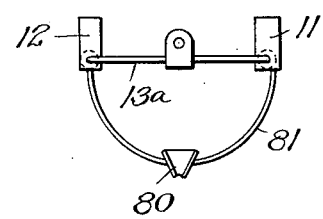
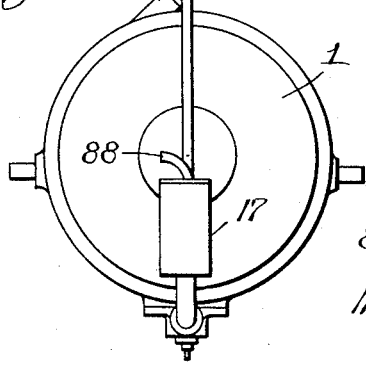
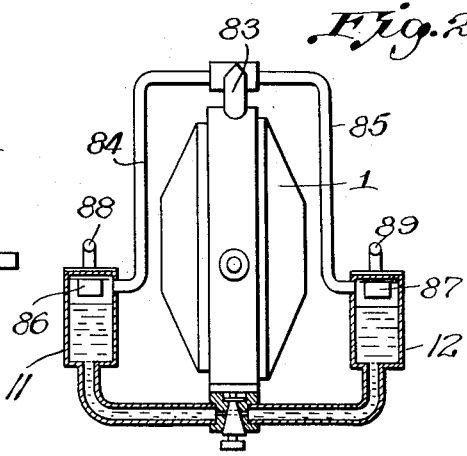
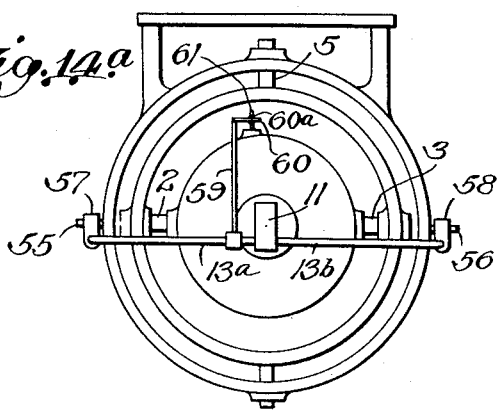
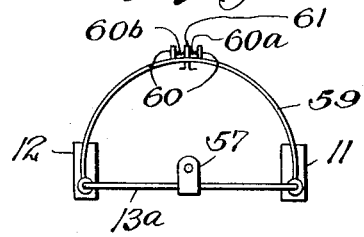

1,866,706

UNITED STATES PATENT OFFICE

JAMES BLACKLOCK HENDERSON, OF LEE, ENGLAND

GYROSCOPIC INSTRUMENT AND APPARATUS

Application filed July 26, 1919, Serial No. 313,537, and in Great Britain June 23, 1917.

(GRANTED UNDER THE PROVISIONS OF THE ACT OF MARCH 3, 1921, 41 STAT. L., 1313)

In gyroscopic apparatus in general the gyroscope or gyroscopes are used to indicate a direction either fixed in space or fixed relatively to the earth. In the former case the gyro is in neutral equilibrium on its trunnions and in the latter case it is either in stable or unstable gravitational equilibrium. The latter type, which constitutes the majority of gyroscopes used in practice and with which my invention is concerned, is subject to certain deviations, when used on board ship or on any moving platform, more especially when the ship is subjected to periodic accelerations due to the action of waves. These deviations are brought about by the couples which act on the gyroscope during the acceleration, due to the centre of gravity of the gyroscope not coinciding with its centre of suspension, that is, due to the gravitational stability or instability.

The object of my invention is to provide a gyroscope which has a gravitational control mechanism and which has therefore a normal or "zero" position fixed relatively to the earth but which is virtually in neutral equilibrium as regards the action of periodic acceleration. My invention comprises a gyroscope which in its zero position has the centre of gravity of the gyro and also that of its gravity control system approximately coincident with its centre of suspension and which acquires a gravity control couple approximately proportional to the tilt of the gyro from the zero position by a relative motion between the gravity control system and the gyro; means whereby it acquires this control couple slowly and means for causing the gyro to precess back to its zero position if disturbed, such means being preferably actuated by the relative motion between the gyro and its gravity control system. In certain cases the gravity control system may produce no direct action on the gyro but may only affect it through the restoring mechanism.

In other words I arrange the centre of gravity of the gyro to be approximately on the trunnion axis when in the normal or "zero" position, and if the gyro axis tilts out of the zero position I arrange a moving weight to move horizontally relatively to the gyro in the plane of the tilt, which is most conveniently done by means of a level.

I arrange the relative motion of the weight due to the level and the gyro to actuate a "restoring couple mechanism" which introduces couples tending to annul the tilt of the gyro directly. I may arrange the relative motion of the weight due to the level and the gyro to actuate a relay which controls the motion of a second weight moving relatively to the gyro.

I may arrange the gravity couple due to the level to be wholly taken by the gyro or to be partly taken by the gyro and partly by the "restoring couple mechanism" or to be wholly taken by the "restoring couple mechanism".

Figs. 1 and 2 show two elevations of one method of applying my invention to a gyroscope which is required to keep its axis tilted relatively to the horizontal plane at any arbitrarily fixed inclination.

Figs. 3 and 4 show details of alternative methods of introducing the restoring couple in Figs. 1 and 2.

Figs. 5, 6, 7, 8, 9 show different alternative arrangements of levels.

Figs. 10, 11 show elevation and plan of an arrangement of the application of my invention to a gyroscope with vertical axis having gravitational control about two trunnion axes.

Figs. 12 and 13 show two elevations of an arrangement of the application of my gravitational control system to a gyro-compass the gyro axis being horizontal.

Figs. 14 and 15 illustrate an alternative method of introducing the restoring couple about the vertical axis of the gyro compass.

Figs. 14a and 15a illustrate a modification of the gyro compass of Figs. 14 and 15.

Figs. 16 and 17 show two elevations of an arrangement in which the level actuates a relay on the gyro which moves the weight maintaining stability.

Figs. 18 and 19 show details of Figs. 16 and 17.

Fig. 20 illustrates a type of valve I may use to prevent the level responding to periodic accelerations.

Figs. 21 and 22 illustrate an arrangement in which the gravity control couple due to the level produces no direct action on the gyro but only a "restoring couple" about the vertical axis.

Figs. 23 and 24 show an arrangement in which the level is fixed to the gyro case.

In Figs. 1, 2 and 14, the gyroscope case 1 containing the gyro rotor is supported on the trunnions 2 and 3 in the inner gimbal ring 4 which is supported on the trunnions 5 and 6 in the outer gimbal ring or frame 7 which is the usual construction of a gyro-compass.

Referring now to Figs. 1 and 2 which illustrate the application of my invention to a gyroscope which is required to keep its rotor axis inclined to the horizontal plane at any arbitrary angle, (Fig. 2) the cranks 8 and 9 are rigidly attached to the trunnions 2 and 3 respectively at 180° phase difference and making the angle $\alpha$ with the plane of rotation of the gyro. The crank 8 carries the crank pin 10 on which the level is pivoted. The level consists of two vertical tubes 11 and 12, closed at the bottom and connected by the small-bore horizontal tube 13 which is fitted with a stopcock 14. This stopcock may have two holes through the barrel, one of large bore giving free passage for the fluid between the vertical tubes 11 and 12 and the other a capillary hole restricting the passage very considerably. The viscosity of the fluid when the capillary passage is in use prevents any considerable quantity of fluid flowing backwards and forwards through the stopcock, due to periodic acceleration of short period.

The tube 13 is mounted on a small bracket 15 which is pivoted on the crank pin 10. The level is constrained relatively to the gyro by two springs 16 and 17 one end of each spring being attached to an eye on the tube 13 and the other end to an eye on a cross bar 20 which is fixed to the crank 8. The bracket 15 also carries a lever 18, hereafter called the "restoring couple" lever, which actuates the mechanism for introducing the torques about the vertical axis. The crank 9 carries the balance weight 19. The level tubes contain a viscous fluid which may be oil or mercury or any other fluid and if the level be balanced and the stopcock 14 closed, the centre of gravity of the level is preferably on the axis of the crank pin 10, and with the level in this condition the centre of gravity of the whole system of gyro and levels is adjusted to be on the axis of the trunnions 2 and 3 by means of the balance weight 19 fitted to crank 9.

One arrangement for introducing the "restoring couples" about the vertical axis is illustrated in Fig. 3. The trunnion 2 of the gyro is hollow, the hole communicating with the inside of the rotor casing so that a jet of air issues through the trunnion due to the fan action of the rotor. The restoring couple lever 18 carries a triangular shaped block 21 two sides of which 22 and 23 are curved and act as vanes dividing the jet issuing from the nozzle 2. The block 21 is attached to the restoring-couple lever 18 by the sleeve 24 which is fixed by a screw 25. As the level tilts the block 21 is deflected laterally and more air is deflected to one side of the block than to the other thus introducing a torque on the gyro about the vertical axis proportional to the tilt of the level. It is evident that in the arrangement in Fig. 3 the air-jet tends to increase the tilt of the level when deflected. Fig. 4 illustrates an arrangement in which the air-jet may tend to decrease the tilt of the level and thus assist the action of the springs 16 and 17. The air-jet issuing from the trunnion 2 is divided by a vane 26 which is pivoted on the vertical trunnions 27 on pivots 27a supported on the sheet metal bracket 28 which is fixed to the trunnion 2. The vane is double towards the end as shown in sketch and the two tail-vanes are stiffened by a horizontal plate 29 between them. A slot in plate 29 engages with a pin 30 fixed to the restoring-couple lever 18 by the sleeve 31. The vane 26 is preferably balanced on its trunnions 27 and the edge of the vane which divides the jet may be placed on the nozzle-side of the trunnions or on the trunnion axis as may be most convenient. The vane 26 may take many other different forms if desired.

The action of the air jet which emerges through the trunnion 2 in Fig. 1, is a follows. The air jet as it emerges from the hollow trunnion is divided by the wedge 21 shown in Fig. 3. If the level is in horizontal position the jet is equally divided and there is no unbalanced force on the wedge 21. Whenever the gyro tilts from its horizontal equilibrium through a small angle the level is forced to tilt through a small angle by the springs 16 and 17 which connect it to the gyro casing. The fluid then flows to one side, and the level tilts a greater amount than the gyro through an additional small angle, the weight of the excess fluid being supported by the springs. This causes the wedge 21 to turn so that the edge of the wedge is no longer directly across the center of the air nozzle, and the air jet therefore exerts a force on the wedge tending to move it further from the centre, thereby putting an additional tilt on the level and causing a further pull by the spring connecting the level to the gyroscope.

It would appear at first sight as if the total couple on the gyroscope about the horizontal trunnion axis when the air jet is acting on the wedge 21 would exceed the gravity couple without the wedge because of the increased tilt of the level produced by the action of the air jet on the wedge. This is not the case, however, because the horizontal force which the air jet exerts on the wedge 21 is transmitted down the rod 18 to the pivot 10, at which point it is transmitted to the gyro case tending to return the gyro case to the vertical and therefore tending to reduce the gravity couple which the level exerts upon the gyroscope. This reduction annuls the effect of the increase of tilt of the level produced by the air jet. Thence the gravity couple about the horizontal trunnion axis due to the level is unaffected by stopping the air jet. The same is true of the type of vane illustrated in Fig. 4 where if the level tilts out of its normal position relative to the gyro casing, the additional torque which is imparted to the level due to the action of the air jet reduces the tilt of the level, thereby apparently reducing the gravity couple on the gyro. This reduction is cancelled however by the torque on the gyro case which is produced by the air pressure on the vanes being transmitted to the case at pivot 10 and assisting the torque due to the level. In this case too the gravity couple about the horizontal trunnion axis is unaffected by the action of the air jet on the vanes although the tilt of the level is considerably affected.

Figs. 5, 6, 7 and 8 show four different alternative arrangements of the level. In Fig. 5 the level consists of a curved tube 33 convex side upwards containing a viscous fluid 34. This tube also contains a ball 35 which is lighter than the fluid it displaces. The ball fits the tube fairly closely so that it can only move very slowly along the tube due to any inclination of the level. The tube may be rectangular in section and the ball be replaced by a roller. Fig. 6 is the counterpart of Fig. 5 except that the tube is curved with convex side downwards and the ball is heavier than the fluid is displaces. Fig. 7 shows a level containing two fluids of different densities. The two vertical tubes 11 and 12 are connected by two horizontal tubes 13 and 13a. The heavy liquid, say mercury, fills the lower half of the level and the lighter liquid, say oil, fills the upper half. The stopcock 14a is preferaby placed in the upper tube so as to restrict the flow of the oil since the flow of mercury through a capillary passage is very erratic under small heads because the column tends to break under the effect of surface tension. In Fig. 8 the lighter liquid has two free surfaces and the level of the liquid in the smaller bore tubes 11a, 12a indicates on a magnified scale the motion of the surface of the heavy liquid in the tubes 11 and 12. Any other known type of level may be used.

Fig. 9 shows an alternative arrangement I may employ for actuating the restoring couple mechanism which produces the torque about the vertical. In Fig. 9 the level 11, 12, 13 is rigidly fixed to the crank 8 instead of being pivoted on the crank pin as Fig. 2. The restoring-couple lever 18 is attached to a balance lever 36 pivoted on a crank pin 37 fixed to the crank 8. The lever 36 has two floats 38 and 39 either suspended from the ends or rigidly attached to the ends and these floats float respectively on the surface of the liquid in the tubes 11 and 12.

In this form of construction, assuming that the gyro tilts from horizontal, the pivoted lever 36, will, due to the flow of liquid, be tilted relative to the gyro casing. The part 18 in Figure 9 is connected to the chute construction shown in Fig. 4. By using the lever 36 a reversal of movement of the lever 18 takes place which reversal will again be compensated for by the reversal of movement of the vane 26 as shown in Fig. 4.

Figs. 10 and 11 represent an elevation and a plan of the application of my invention to a gyro having a vertical spinning axis. The gyro case 1 is supported on the trunnions 2 and 3 in the gimbal ring 4 which is supported in its turn on the trunnions 5 and 6 in a frame which is not shown but it may be one of a second set of gimbal rings. The gyro is controlled gravitationally about the trunnions 2 and 3 by the level 11, 12, 13 similar to that described in Fig. 1, which is attached to the shaft 40 pivoted in the lugs 41 and 42, which project vertically upwards from the gyro case 1. A similar level 11', 12', 13' fixed to the shaft 40', pivoted below the gyro on the lugs 41' and 42' which project vertically downwards from the gyro case serves to control the gyro gravitationally about the trunnions 5 and 6. The two jets emerge from the gyro case through the nozzles 47 and 48 and these impinge respectively on two vanes 43 and 44 attached to the upper level by the brackets 45 and 46, the vanes being inclined to the horizontal plane say at 45° and the jets being at 45° to the trunnion axes. In the normal position the bottom edge of each vane is on the level of the centre of the jet. A similar arrangement of jets 47' and 48' is arranged to impinge on vanes 43' and 44' attached to the level. It is evident that if the jets are sufficiently strong no spring control will be required between the level and the gyro, and if the jets are in a plane at 45° to the trunnion axis the air-jet torque on the level has two components one balancing the gravity torque and the other at right angles to it. The latter is the "restoring-couple" which restores the gyro axis to the vertical and the former is transmitted to the gyro through the shaft 40 and the lugs 41 and 42.

The level may also have spring control in addition to the air-jet control just as in Fig. 2 in which case the damping torque is smaller than the gravity torque. These springs are shown in dotted lines and are indicated 16a and 17a.

The action of the air jets in this form is as follows. As has already been described the vanes 43 and 44 are attached by brackets 45 and 46 to the horizontal trunnion 40 upon which the level 11, 12, 13 is mounted, so that all of these parts are supported for movement together. Since the vanes 43 and 44 are arranged at 45° both to the horizontal and vertical planes through the trunnion 40, it will be seen that the air jets issuing from 47 and 48 will exert respectively on vanes 43 and 44 pressure which can be resolved horizontally and vertically. The horizontal components, in the normal position of the level, balance each other and cause no unbalanced torque on the gyroscope. In the same manner the vertical forces against the vanes 43 and 44 cause a vertical thrust upward upon each of the bearings of shaft 40, which removes a part of the weight of the pivoted level from the brackets 41 and 42 but does not introduce a torque on the gyroscope. Assuming now that the gyro tilts from its normal position as shown in Fig. 10 so that the right hand end tilts downwardly, then, due to the spring connection to the level, the level will also tilt downwardly to the right and as the liquid flows through the capillary tube, the level will tilt to a greater extent than the gyroscope, and the spring 16a will pull upwardly on the left hand end of the gyro casing tending to cause a further tilt of the gyroscope. This tilting of the level relative to the gyroscope will cause the vane 43 also to tilt downwardly so as to deflect to a greater extent the air jet from the nozzle 47 and the vane of 44 will move upwardly and deflect to a less extent the air jet from nozzle 48. The difference between the vertical component pressures on vanes 43 and 44 transmitted to the gyro case through the pivots of the axis 40 produces on the gyroscope an unbalanced torque about the axis 5—6 which causes the gyrocsope axis to precess back to the vertical. It will be seen that if the tilt of the gyroscope is in the direction at 90° (i. e. about the axis 5—6) the same will be true through the action of the vanes 43′ and 44′.

Figs. 12 and 13 show two elevations of one method of applying my invention to the gyro of a gyro compass having a horizontal rotor axis. The gyro case 1 has two lugs 50 and 51 projecting downwards from it which carry the pivots to support the shaft 49 on which the level 11, 12, 13 is fixed. The level is constrained relatively to the gyro by the springs 16 and 17. The torque about the vertical may be introduced by means of an air jet emerging through the trunnion 2 which is deflected by a vane as in Fig. 4 actuated by the restoring-couple lever 18 rigidly attached to the wire frame 52 the ends of which are fixed to the tube 13 of the level at 53 and 54.

The gyro-compass having been set up with its axis horizontal, it gradually acquires a tilt of this axis, due to the rotation of the earth. The level also tilts with the gyroscope and the fluid flows from one side to the other, say from the vessel 11 to the vessel 12, the vessel 11 being the higher. The weight of the excess fluid in 12 stretches the spring 16 and contracts the spring 17, thus the level tilts relatively to the gyroscope by an amount which, in the absence of viscosity in the level, is proportional to the tilt of the gyro axis. The spring forces transmitted through the springs 16 and 17 to the gyro case introduce a horizontal precession of the gyroscope which, combined with the tilting motion produced by the earth's rotation, introduces the elliptical conical precession about the meridian which is common to all gyro-compasses up-to-date. The deflection of the pin 18 and of the wedge 21 which it carries (see Fig. 3) deflects the air jet issuing from the trunnion 2 by an amount which is proportional to the tilt of the level relatively to the gyroscope. This horizontal deflection of the jet produces a horizontal force on the wedge 21 parallel to the rotor axis which transmits a couple to the gyroscope about the vertical axis through the pivots of the level. The torque about the vertical causes the gyroscope to precess vertically so that the tilt of the rotor axis is always being decreased.

Alternatively I may introduce the torques about the vertical by a direct reaction from the following mechanism due to the gravity couple as is shown in Figs. 14 and 15 and Figs. 14a and 15a. The gyro case 1 is mounted in neutral equilibrium on its trunnions 2 and 3 in the gimbal ring 4 which is mounted on the vertical trunnions 5 and 6 in the following element 7 in the usual manner. The level consists of two vertical tubes 11 and 12 (Fig. 15) connected by two semi-circular tubes 13a and 13b. These tubes carry two lugs 57 and 58 which serve to support the level pivotally on two trunnions 55 and 56 which are attached to the following element 7 as nearly coaxial with the trunnions 2 and 3 as possible. The tube 13a has attached to it a wire bridge 59 which carries a fork 60 which engages with a pin 61 fixed eccentrically on the gyro case 1, as shown in Fig. 14. An alternative arrangement is shown in Figs. 14a and 15a in which the outer ends of two springs 60a and 60b are attached to the fork 60 and the inner ends of the springs are attached to the pin 61 on the gyro case 1.

The compass having been set up with its gyro axis horizontal, it gradually acquires a tilt due to the rotation of the earth. The fluid flows from one side of the level to the other, the weight of the excess fluid on the low side, which in the arrangement of Figs. 14a and 15a is supported by the difference of tension in the two springs 60a and 60b, thus producing a force on the pin 61. The force on the pin has a moment about the axis 2—3 which produces the ordinary horizontal precession of the rotor axis, and this precession combined with the vertical tilting motion of the rotor axis due to the earth's rotation produces the well known elliptical conical precessional motion of the rotor axis about the meridian. The moment of the force on the pin 61 about the axis 5—6 produces a vertical precession of the rotor axis causing it to precess downwards when tilted upwards and vice-versa, which, combined with the conical precessional motion damps out the latter.

In all the above arrangements the gyro is in gravitational instability due to the level. I may prefer sometimes to put the gyro in gravitational stability and employ the level merely as a relay to control the stability mechanism. Figs. 16 and 17 show two elevations of one arrangement I may employ for the purpose. Two cylindrical vessels 62 and 63 are rigidly attached to opposite sides of the gyro case 1. These vessels are connected by tubes 65 and 66 with a small rotary pump 64 which serves to pump a liquid backwards and forwards between the vessels 62 and 63, the object being to raise the level of the fluid in whichever vessel is the higher due to tilting of the gyro and to make the rise of level proportional to the tilt. The pump rotor is driven by one or other of two small Pelton turbine rotors 67a and 68a which are shown in the plan view of the pump and its connections in Fig. 18. Two air jets emerge from the gyro case through the nozzles 67 and 68 and impinge on the buckets 69 and 69a of the Pelton rotors. One or other jet is cut off by means of the level 11, 12, 13, which is fixed to the shaft 71 pivotally supported on the lugs 70 and 70a projecting upwards from the gyro case 1. The level is constrained by two floats 74 and 75 floating in the fluid in the vessels 62 and 63 respectively, to which cords are attached which pass over pulleys 76 and 77 pivoted on brackets projecting from the lugs 70 and 71, the ends of the cords being attached to the vertical cranks 72 and 73 attached to the shaft 71. The jets are controlled from the level by means of a shutter 78 attached to the tube 13 of the level by means of a U-shaped wire frame 79. The shape of the shutter 78 is shown in plan in Fig. 19 from which it will be seen that in the central position the jets 67 and 68 are each half covered by the shutter. Should the level become inclined one or other jet is completely cut off and the pump rotates raising the level of the fluid in the higher of the two vessels 62 and 63. The raising of the one float and lowering of the other raises the level 11, 12, 13 again and restores the shutter again to its central position. The difference in heights of the fluids in the two vessels 62 and 63 is thus proportional to the tilt of the gyro axis and the elevated vessel contains the greater quantity of fluid, the difference of weights tending to restore the gyro axis to the horizontal plane. The damping may be worked by any of the mechanisms described above.

Fig. 20 illustrates a valve which I may insert instead of or in addition to a capillary construction in the tube 13 connecting the two vertical vessels 11 and 12 of the level in Fig. 2 with the object of preventing any flow taking place due to horizontal acceleration of the level when the acceleration exceeds a prescribed limit. The tube 13 is divided into two parts 13a and 13b connected by a coupling 80, 81, the two halves being separated by a spring diaphragm 82 which acts as a valve. This diaphragm has a number of holes through it near its periphery through which the fluid can flow from side to side and it may also be loaded at the centre say by a ball 83. When the acceleration exceeds a certain limit the forces on the diaphragm due to the acceleration of the fluid and the acceleration of the ball 83 cause the diaphragm to close one or other of the tubes 13a or 13b depending on the direction of the acceleration.

In gyro apparatus such as gyro compasses in the action of which the rotation of the earth plays an important part it is to be understood that if the gyro is in unstable equilibrium due to the level I revolve the rotor in the opposite sense to the rotation of the earth. This is also of importance in navigational apparatus for aircraft to determine the ground speed.

In describing Figs. 1 and 2, 10 and 11, it has been pointed out that the forces on the vanes due to the jets may affect the gravity control couple on the gyro. This effect can be determined in any case by investigating whether the net momentum of the jets after leaving the vanes has a moment about the gyro trunnion axis (not pivotal axis of the level) about which the gravity control couple acts. Thus in Figs. 1 and 2, 12 and 13, the jets leave in plane through the trunnion axis and therefore do not affect the gravity control couple. In Figs. 10 and 11 the net momentum of the two jets will have a moment about the trunnion axis and the gravity couple will be affected, the amount by which it is affected depending upon whether the levels are constrained by springs or not, and upon the distance between the trunnion axis 2 and the pivotal axis of the level 40, Fig. 10. If these two axes were made to coincide and there is no difficulty in arranging the several parts so that they do coincide, then in the absence of spring control on the level the gravity couple on the level cannot be transmitted to the gyro directly. It is balanced by the jets which produce the restoring-couple as before, thus the level controls the jets and through them controls the gyro.

This arrangement will be very serviceable in many applications since it eliminates the precession due to the gravity couple, notably in a ground speed indicator for aircraft.

Figs. 21 and 22 illustrate an arrangement of gyro with horizontal rotor axis in which the level produces no direct gravity couple on the gyro but only the restoring-couple about the vertical. The level 11, 12, 13, similar to that described in Fig. 14 is pivoted on two trunnions 2a and 3a, coaxial with the main trunnions 2 and 3 of the gyro case 1. A nozzle 82 emits a jet passing vertically and centrally from the case 1. The level is controlled by this jet which enters the hopper shaped chute 80 open at the bottom, through which the jet passes. This chute is attached to the level by the wire frame 81. The gravity couple on the level deflects the jet and since it is not on the center line of the gyro a torque about the vertical is the result.

If the axis 2a—3a be raised above or lowered below the axis 2—3, by means of cranks attached to the trunnions 2, 3 say through a distance equal to the distances of the jet from the center line of the gyro, suitable counterbalance weights being attached to the gyro-case the jet produces a direct gravity couple on the gyro equal to the "restoring-couple". If the axis is raised this gravity couple tends to increase the tilt of the gyro but if the axis is lowered it tends to reduce the tilt, thus by raising or lowering the pivotal axis of the level in Fig. 21 the gyro can be placed either in unstable or stable gravitational equilibrium. If the jet were arranged above the trunnion axis the couples on the gyro would be reversed. If the gyro be in stable equilibrium the jet would be placed on the opposite side of the center line and the rotation reversed. Thus by moving the axis 2a—3a, or by employing springs to control the level the two couples can be relatively adjusted.

If the arrangement of gyro illustrated in Figs. 21 and 22 be employed in a gyro compass the tilt of the level relatively to the gyro at any instant would indicate the deviation of the compass from the meridian but the gyro would have little or no tendency to precess towards the meridian. It is however possible to have an aperiodic arrangement in which there is a gravity couple, as well as a restoring-couple, and in which the deviation from the meridian is indicated by the tilt of the level and in which the gyro precesses slowly towards the meridian. The gyro illustrated in Figs. 12, 13 for example can be adjusted so that its motion is aperiodic and satisfies the above condition, or that in Fig. 21 by suitably arranging the relative magnitudes of the two couples. If the vane 26 in Fig. 4 were used with the gyro of Fig. 12 the deviation of the vane 26 in azimuth being proportional to the tilt of the level would be proportional to the deviation of the gyro from the meridian and might be arranged to be equal to it. By suitable gearing therefor the deviation of the vane 26 may automatically actuate a pointer which will indicate the meridian even when the gyro deviates from the meridian by several degrees.

It may seem at first sight as if the reaction to the gravity torque in Fig. 21 must come on the gyro but this is not so. It comes on the surrounding air and the gyro is only affected secondarily by eddy currents or in as much as the conservative system in the surrounding air is affected, which connects the jet with the inflow orifices in the gyro case.

In a gyro compass I may arrange the latitude adjustment by displacing the air chute relatively to the level by means of a screw or by moving a weight on the level and adjusting the point of attachment of the spring on the gyro case by means of a screw.

Figs. 23 and 24 show an alternative arrangement for controlling the air jet to that illustrated in Fig. 9 in which the level is rigidly attached to the gyro-case. It is illustrated as applied to a gyro with horizontal rotor axis but is equally applicable to any other gyro. The level 11—12 is rigidly attached to the gyro-case 1 and the air nozzle 83 is connected by the two pipes 84 and 85 with the two cups 11 and 12 respectively of the level. The covers of the level cups have two small cylindrical diving bells 86 and 87 attached to them and from the inside of these cups the two jet orifices 88 and 89 emerge, the two jets being parallel and in the same direction perpendicular to the rotor axis. The air in passing through the cups to the jets has to pass between the surface of the fluid and the edge of the diving bell, hence a tilt of the level will throttle one jet and increase the other and will therefore give rise to a couple about the vertical. The jet orifices are turned in such a direction that this couple tends to annul the tilt causing it.

The gyroscope having been set up with its rotor axis horizontal, it gradually acquires a tilt, due to the rotation of the earth. The level tilts with it, and the fluid flows from one side to the other, say from vessel 11 to vessel 12. A direct gravity couple is thus produced upon the gyroscope tending to increase the tilt, but as the gyro rotor revolves in the opposite sense to the earth, the horizontal precession introduced by the direct gravity couple combines with the tilt introduced by the rotation of the earth to give a conical elliptical, precessional motion of the gyro axis about the meridian.

Two jets of air are emerging from the nozzles 88 and 89 and when the rotor axis is horizontal these two jets are equal and there is no resultant torque about the vertical due to the air jets. When the gyro tilts, however, and the fluid rises in the vessel 12 and falls in the vessel 11, the flow of the air to the nozzle 89 is throttled, and the flow from the nozzle 88 is facilitated, thus the jet from the nozzle 88 increases and that from 89 diminishes, hence the tilt of the gyroscope produces a torque about the vertical which causes the rotor axis to precess vertically producing a tilt. Thus the oscillations of the compass about the meridian are damped out.

Having now particularly described and ascertained the nature of my said invention, and in what manner the same is to be performed, I declare that what I claim is:—

1. A gyroscopic apparatus comprising a gyroscope having its direction of rotation opposite to the direction of rotation of the earth, and a movable mass associated with said gyroscope and displaceable in a substantially horizontal plane upon a tilt of the gyroscope from its normal position, the direction of the displacement of the mass corresponding to the direction of the tilt.

2. In a gyroscopic apparatus, a movable system comprising a gyroscope having its direction of rotation opposite to the direction of rotation of the earth, and gravity controlled means for causing the centre of gravity of the movable system to be shifted in a substantially horizontal plane upon a tilt of the gyroscope to apply a torque about an axis of the gyroscope.

3. A gyroscopic apparatus comprising a gyroscope having its direction of rotation opposite to the direction of rotation of the earth, and a gravity controlled device associated therewith, said gyroscope and device being in neutral equilibrium in their normal position and the centre of gravity of the system shifting to apply a torque about an axis of the gyroscope when the gyroscope tilts.

4. A gyroscopic apparatus comprising a gyroscope and a liquid level device associated therewith and having a movement relative to said gyroscope for applying a torque about an axis of the gyroscope.

5. A gyroscopic apparatus comprising a gyroscope and a fluid system associated with said gyroscope comprising a pair of interconnected vessels having a movement relative to said gyroscope for applying a torque about an axis of the gyroscope.

6. A gyroscopic apparatus comprising a gyroscope, and a liquid level device pivotally mounted for movement relative to said gyroscope for applying a torque about an axis of the gyroscope.

7. A gyroscopic apparatus comprising a gyroscope and a fluid system comprising a pair of interconnected vessels, said vessels being pivotally mounted for movement relative to said gyroscope for applying a torque about an axis of the gyroscope.

8. A gyroscopic apparatus comprising a gyroscope and a liquid level device for imparting a torque around an axis of the gyroscope, and means controlled by said device for imparting a torque around another axis of said gyroscope.

9. A gyroscopic apparatus comprising a gyroscope rotating in the opposite direction to the direction of rotation of the earth and a liquid level device associated with the gyroscope for applying a torque around an axis of the gyroscope.

10. A gyroscope apparatus comprising a gyroscope, a gravity control for said gyroscope comprising a level for imparting a torque around one axis of the gyroscope and fluid pressure means for imparting a torque around another axis of the gyroscope.

11. A gyroscopic apparatus comprising a gyroscope, a liquid level device, and a connection between said gyroscope and device for imparting a torque around two axes of the gyroscope.

12. A gyroscopic apparatus comprising a gyroscope, a liquid level device having a relative movement with respect to said gyroscope and resilient means connecting said device to said gyroscope whereby a torque may be applied about an axis of the gyroscope.

13. A gyroscopic apparatus comprising a gyroscope, a pivoted level, connections between the gyroscope and the level and means for moving said level with respect to said gyroscope.

14. A gyroscopic apparatus comprising a gyroscope having a normally horizontal spinning axis and mounted for turning about a vertical axis, a liquid level device, and means controlled by said device for imparting a torque around the vertical axis of the gyroscope.

15. A gyroscopic apparatus comprising a gyroscope rotating in the opposite direction to the direction of rotation of the earth, a pivoted liquid level device, and connections between the gyroscope and the level device to cause them to mutually react on each other.

16. A gyroscopic apparatus comprising a gyroscope and its casing, an air jet reacting from said casing, a liquid level device, and a member controlled by said device for directing said air jet to cause it to exert a torque on said gyroscope.

17. In a gyroscopic compass, the combination with a gyroscope casing, of means for transferring liquid from one side of an axis of the casing to another to impart meridian seeking properties, including two liquid containing vessels and a duct connecting them, the form of said vessels being such that the ends of the liquid column are of larger cross sectional area than the intermediate connecting body, for the purpose specified.

18. In an apparatus of the class described, the combination of a gyroscope and means for mounting the same to rotate in a direction opposite that of an ordinary pendulous gyroscopic compass, of liquid containing means for transferring liquid from one side to the other, by gravity, for imparting meridian seeking properties thereto.

19. In a gyroscopic compass, the combination with a gyroscope casing, of a power driven follow up member, and a liquid containing vessel pivotally supported upon the follow up member and having a connection with said casing for imparting meridian seeking properties thereto.

20. In a gyroscopic compass, the combination with a gyroscope, of means for mounting the same near its center of gravity for oscillation about a horizontal axis, and for turning about a vertical axis, a follow-up element adapted to turn with said gyroscope about said vertical axis and a liquid containing means pivotally secured to said element and having an eccentric connection with said gyroscope for both imparting meridian seeking properties to the gyroscope and damping the oscillations thereof.

21. In a gyroscopic compass, the combination with a gyroscope casing and means for mounting the same for oscillation about a horizontal axis and turning about a vertical axis, of a follow-up member constrained to follow the movements of said casing about the vertical axis, means for imparting directive power to said casing comprising a mass movable laterally with respect to said horizontal axis on inclination of said casing and supported on said follow-up member, said mass being connected to said casing about an axis inclined to the horizontal.

22. The combination with a gyroscopic compass having a gyroscope and means for supporting the same in substantially neutral equilibrium about a horizontal axis, of a container mounted at each side of the axis of said gyroscope and adapted to contain a liquid, a connection permitting interchange of liquid between said containers, said containers being also connected to said gyroscope to exert a torque thereon about both a horizontal and a vertical axis as the liquid flows from one container to the other.

23. In a gyroscopic compass, the combination with a gyroscope casing and means for mounting the same for oscillation about a horizontal axis and turning about a vertical axis, of a follow-up member constrained to follow the movements of said casing about the vertical axis, means for imparting directive power to said casing comprising a mass freely movable laterally with respect to said horizontal axis on inclination of said casing and supported on said follow-up member, said mass being connected to said casing about an axis inclined to the horizontal.

24. In a gyroscopic compass of the type referred to, the combination with a gyroscope casing, of a follow-up member surrounding the gyroscope casing, and a liquid containing vessel pivotally supported upon said follow-up member and having a connection with said casing to impart meridian seeking properties thereto.

25. In a gyro-compass, the combination with a rotating wheel and means for mounting the same in substantial equilibrium for oscillation about a horizontal axis and turning about a vertical axis, of laterally shiftable means for imparting directional or meridional seeking properties thereto and means for damping the oscillations thereof about either or both of said axes, said damping means being brought into action by said first named means.

26. In a gyro-compass, the combination with a rotating wheel and means for mounting the same in substantial equilibrium for oscillation about a horizontal axis and turning about a vertical axis, of means having a substantially horizontal lever arm for imparting directional or meridional seeking properties thereto and for damping the oscillations thereof about either or both of said axes.

27. In a gyro-compass, the combination with a rotating wheel and means for mounting the same in substantial equilibrium for oscillation about a horizontal axis and turning about a vertical axis, of normally non-pendulous means for imparting directional or meridional seeking properties thereto and means for damping the oscillations thereof about either or both of said axes, said damping means being brought into action by said first named means.

28. In a gyro-compass, the combination with a rotating wheel and means for mounting the same in substantial equilibrium for oscillation about a horizontal axis and turning about a vertical axis, of normally non-pendulous means responsive to the inclination of said wheel for imparting directional or meridional seeking properties thereto and for damping the oscillations thereof about either or both of said axes, said damping means being brought into action by said first named means.

29. In a gyro-compass, the combination with a rotating wheel and means for mounting the same in substantial equilibrium for oscillation about a horizontal axis and turning about a vertical axis, of independently supported normally non-pendulous means for imparting directional or meridional seeking properties thereto, a member attached to the mounting means at one side of said vertical axis and a connection between the non-pendulous means and the member for damping the oscillations of the compass.

30. In a gyroscopic compass, the combination with a gyroscope and a casing therefor supported for oscillation about a horizontal axis and for turning about a vertical axis, a liquid level device and a connection between the casing and the device, said device including normally balanced fluid-containing receptacles on opposite sides of the horizontal axis and a flow-restricting connection therebetween proportioned to cause a flow of fluid from one side of the horizontal axis to the other to impart meridian seeking properties to the gyroscope while said flow of fluid is substantially unaffected by rolling of the ship.

31. In a gyroscopic compass, the combination with a gyroscope supported for movement about a vertical axis and a horizontal axis and having its center of gravity approximately on the horizontal axis when the gyroscope is in normal position, of means for shifting the relative positions of the center of gravity of the gyroscope and the horizontal axis to the lower side of the gyroscope upon inclination of the gyroscope about the horizontal axis.

32. In a gyroscopic compass, the combination with a gyroscope supported for movement about a vertical axis and a horizontal axis and having its center of gravity approximately on the horizontal axis when the gyroscope is in normal position, of means for shifting the relative positions of the center of gravity of the gyroscope and the horizontal axis to the lower side of the gyroscope upon inclination of the gyroscope about the horizontal axis and means for damping the oscillations of the gyroscope.

33. In a gyroscopic compass, the combination with a gyroscope supported for turning about a vertical axis and for oscillation about a horizontal axis, said gyroscope being substantially balanced about the horizontal axis, of a fluid container on each side of the horizontal axis constrained to move with the gyroscope, and a transverse connection between said containers, permitting free interchange of the fluid upon application of a force destroying the equilibrium thereof.

34. In a gyroscopic compass, the combination with a gyroscope supported for turning about a vertical axis and for oscillation about a horizontal axis, said gyroscope being substantially balanced about the horizontal axis, of a mass constrained to turn with said gyroscope about said horizontal axis, but free to move laterally across said axis under the influence of gravity upon inclination of the gyroscope, and means for rotating the gyroscope so that it rotates in the opposite direction to the earth when the compass is in its normal position.

JAMES BLACKLOCK HENDERSON.